United States Patent [19]
Hahn

[11] Patent Number: 5,687,484
[45] Date of Patent: Nov. 18, 1997

[54] PUMPKIN CARVING KNIFE

[76] Inventor: Michael Hahn, 3340 SE. Federal Hwy., Suite 232, Stuart, Fla. 34997

[21] Appl. No.: 622,197

[22] Filed: Mar. 25, 1996

[51] Int. Cl.$^6$ .................................................. B27B 21/00
[52] U.S. Cl. ................................ 30/502; 30/353; 30/355
[58] Field of Search ................................ 30/123, 166.3, 30/314, 315, 317, 353, 355, 357, 501, 287, 502; D7/649

[56] References Cited

U.S. PATENT DOCUMENTS

| | | |
|---|---|---|
| D. 32,786 | 6/1900 | Moore . |
| D. 48,474 | 1/1916 | Lehrman . |
| D. 50,096 | 12/1916 | Forster . |
| D. 136,023 | 5/1943 | Phillips . |
| D. 137,687 | 2/1944 | Morris . |
| D. 162,683 | 7/1951 | Ono et al. . |
| D. 173,124 | 3/1954 | Niblack . |
| D. 268,639 | 4/1983 | Johannsen . |
| 325,364 | 9/1885 | Shipe . |
| 1,265,276 | 5/1918 | Stephens . |
| 1,578,827 | 9/1926 | Holsinger . |
| 2,814,870 | 12/1957 | Treiber ........................ 30/353 |
| 2,907,108 | 4/1959 | Nolte . |
| 3,032,084 | 12/1962 | Traben . |
| 3,205,575 | 9/1965 | Senkewitz .................... 30/355 |
| 3,279,065 | 10/1966 | Senkewitz . |
| 4,348,807 | 9/1982 | Ashdown et al. ............ 30/287 |
| 4,841,638 | 6/1989 | Bardeen et al. ............. 30/332 |
| 5,062,338 | 11/1991 | Baker . |
| 5,216,812 | 6/1993 | Lyons . |
| 5,322,277 | 6/1994 | Paul et al. . |

OTHER PUBLICATIONS

Photographs of Pumpkin Carver, Michael Hahn and Joe Sindoni, Feb., 1992.
Pamphlet of "The Original Pumpkin Carver", Michael Hahn and Joe Sindoni, 1992.

*Primary Examiner*—Hwei-Siu Payer
*Attorney, Agent, or Firm*—Quarles & Brady

[57] ABSTRACT

A child safe cutter for use by children in carving pulpy round fruits such as pumpkins. The cutter is capable of clearing particulate from a cut being formed in the fruit to prevent jamming and sticking of said cutter caused by the compression of the pulp about the blade. The cutter includes a handle for gripping and an elongated blade mounted thereon. The blade extends away from the handle to define a tip and has at least one edge, and two opposing sides defining a thickness. The blade has a trough of gradually increasing width and depth formed along at least one of its two opposing sides to facilitate the removal of pulp and particulate matter so the blade may move freely in the fruit when cutting. The tip has a hook formed thereon extending from an edge of the blade and curving toward the blade's centerline. A plurality of cutting teeth are positioned transversely along at least a portion of the one or more edges of the blade in an area between the handle and the tip. Each of the cutting teeth are provided with at least one cutting edge which extends slightly beyond the thickness of the blade. The cutting teeth are alternately angularly disposed relative to each other for enhanced cutting.

9 Claims, 4 Drawing Sheets

PUMPKIN CARVING KNIFE

BACKGROUND OF THE INVENTION

1. Field of the Invention

This invention relates generally to cutting devices, and more particularly to child safe cutting devices for use in carving pulpy round fruits such as pumpkins.

2. Description of the Prior Art

It is traditional during certain holidays, including the Halloween holiday, for families and individuals to carve certain types of pulpy round fruits such as pumpkins. A wide variety of pointed and sharp bladed instruments are available for specific types of cutting tasks, including fruit carving. In general however, such cutting instruments are unsuitable for use by children who cannot safely be allowed to handle such items. In particular, young children may be endangered by use of metal cutting instruments having elongated pointed ends and sharp cutting edges. On the other hand, use of ordinary plastic cutting utensils having rounded edges has proved to be ineffective and unsuitable for cutting the thick and tough outer skin of pumpkins and other types of pulpy round fruits.

One common problem with both metal and plastic cutters of the prior art relates to compression of the fruit around the cutting instrument. This problem occurs when a cutting instrument penetrates a fruit skin and then becomes locked in position therein as a result of the compression of the fruit about the cutting blade. Jamming of the cutting instrument in this manner is especially problematic as it can tend to lead to accidents and lacerations when efforts are made to dislodge the blade.

Nevertheless, it is a continuing desire of children to take part in pumpkin carving activities. Accordingly, it would be desirable to provide a child-safe cutter for pulpy round fruits such as pumpkins. It would further be desirable to provide a child safe cutter which has no elongated pointed ends or sharp edges, but is capable of easily slicing through the tough outer skin of fruits such as pumpkins. It would also be desirable to provide a cutter which avoids problems associated with becoming jammed or stuck in a fruit when the fruit compresses about the blade during cutting operations.

SUMMARY OF THE INVENTION

A child safe cutter for use by children in carving pulpy round fruits. The cutter is capable of clearing particulate from a cut being formed in the fruit to prevent jamming and sticking of said cutter. The cutter includes a handle for gripping and an elongated blade mounted thereon. A tapered nub is preferably provided for puncturing the tough outer skin of the fruit. The blade extends away from the handle to define a tip and has at least one edge, and two opposing sides defining a thickness. The blade has a trough of gradually increasing width and depth formed along at least one of its two opposing sides to facilitate the removal of pulp and particulate matter so the blade may move freely in the fruit when cutting. The tip has a hook formed thereon extending from an edge of the blade and curving toward the blade's centerline. A plurality of cutting teeth are positioned transversely along at least a portion of the one or more edges of the blade in an area between the handle and the tip. Each of the cutting teeth are provided with at least one cutting edge which extends slightly beyond the thickness of the blade. The cutting teeth are alternately angularly disposed relative to each other for enhanced cutting.

DETAILED DESCRIPTION OF THE PREFERRED EMBODIMENTS

Figure 1:
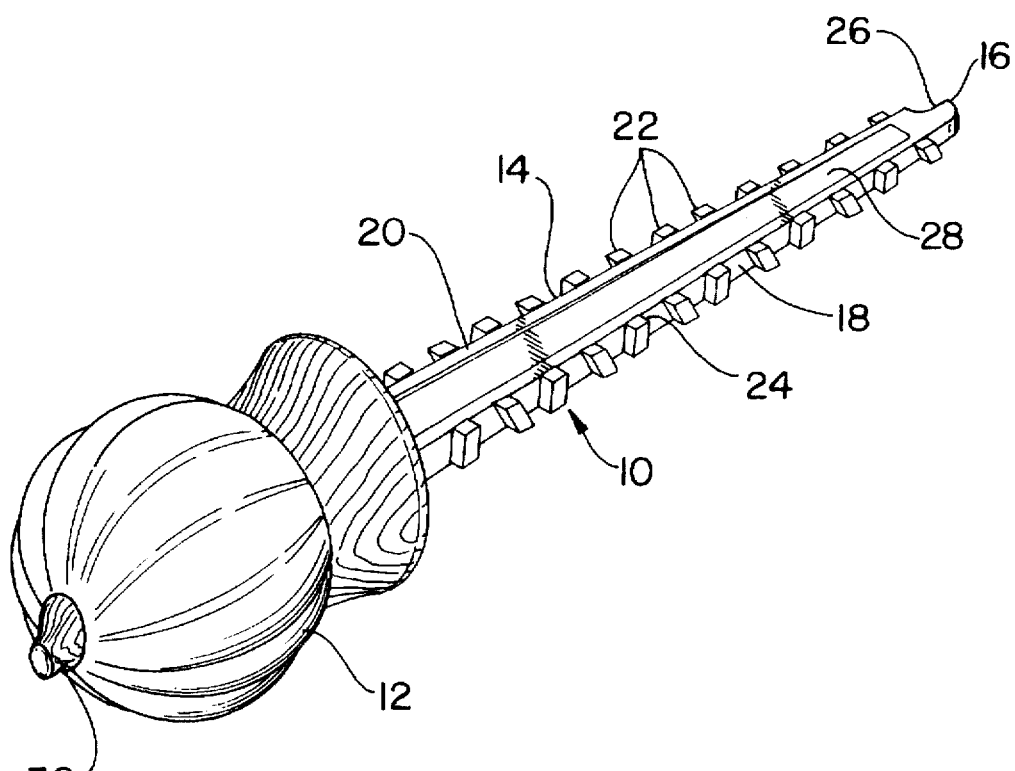
FIG. 1 is a perspective view of a carver according to the invention.
Figure 2:
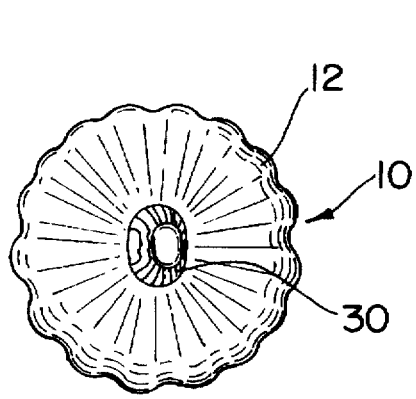
FIG. 2 is a top plan view of the carver in FIG. 1.
Figure 3:
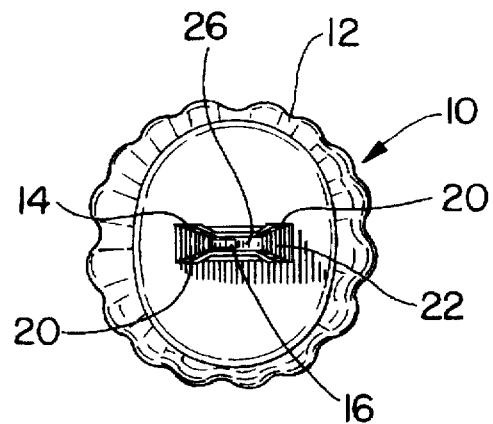
FIG. 3 is a bottom plan view of the carver if FIG. 1.
Figure 4:
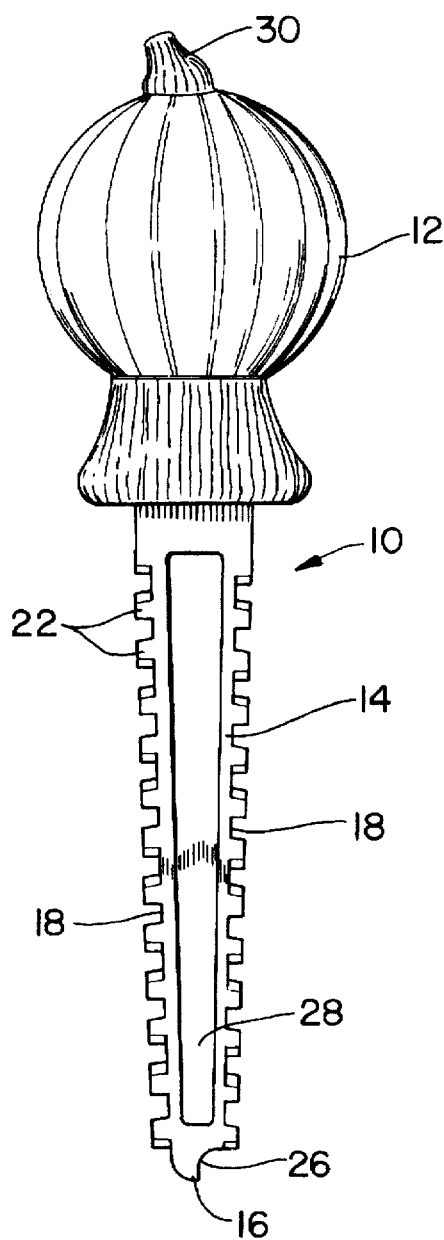
FIG. 4 is a front elevation view of the carver in FIG. 1.
Figure 5:
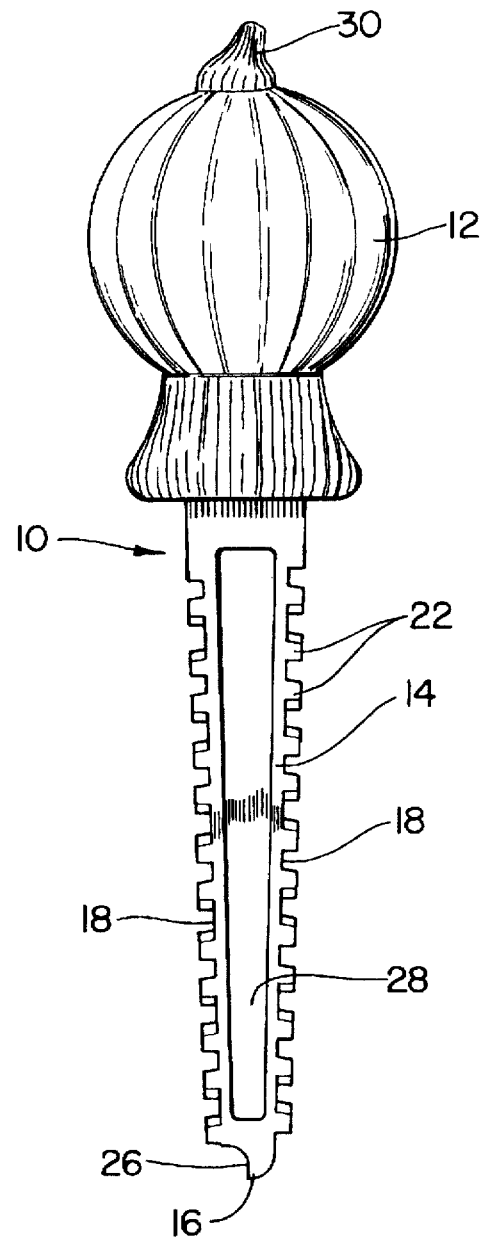
FIG. 5 is a rear elevation view of the carver in FIG. 1.

Referring to FIGS. 1–7, there is shown a child safe cutter 10 which may be used to cut large pulpy round fruit such as pumpkins. The cutter 10 includes a handle 12 and an elongated blade 14 extending therefrom. Formed along blade edges 18 are cutting teeth 22. The blade 14 and teeth 22 are preferably formed from plastic but may also be formed from any other material which is of sufficient hardness to cut large pulpy fruit such as pumpkins. In this case, plastic is preferred over metal for the material of the blade 14 in order to help minimize the risk of laceration or other injury to child users of the cutter. Also, plastics are a desirable material because of their minimal expense, ease to mold and resistance to corrosion. For the purposes of manufacturing efficiency, the handle 12, blade 14 and cutting teeth 22 may all be formed from a single type of plastic material to facilitate injection molding of the completed product. In such case, the handle 12 may advantageously be integrally formed with the blade 14.

In FIGS. 1–7, the handle 14 is shaped like a pumpkin for improved appearance. However, it should be noted that such feature is not intended to limit the scope of the invention and the handle may be chosen to have any suitable shape for gripping. In a preferred embodiment, a nub 30 is provided on the cutter 10. The nub 30 may be positioned on an end of the handle 12 opposite from the blade 14, or at any other suitable location on the cutter 10 which does not interfere with the cutting operation of the blade 14. The nub 30 is preferably formed with a wedge shaped or tapered distal end and is preferably less than about one half inch (½") from its base to its end. The nub 30 is provided to permit a user to initially puncture the tough outer skin of a pumpkin or other large pulpy round fruit and needs only to be long enough to puncture the outer skin. Once the initial puncture is made with the nub, the tip 16 of the blade 14 is used as described below to work the cutter 10 deeper into the body of the fruit.

Figure 6:
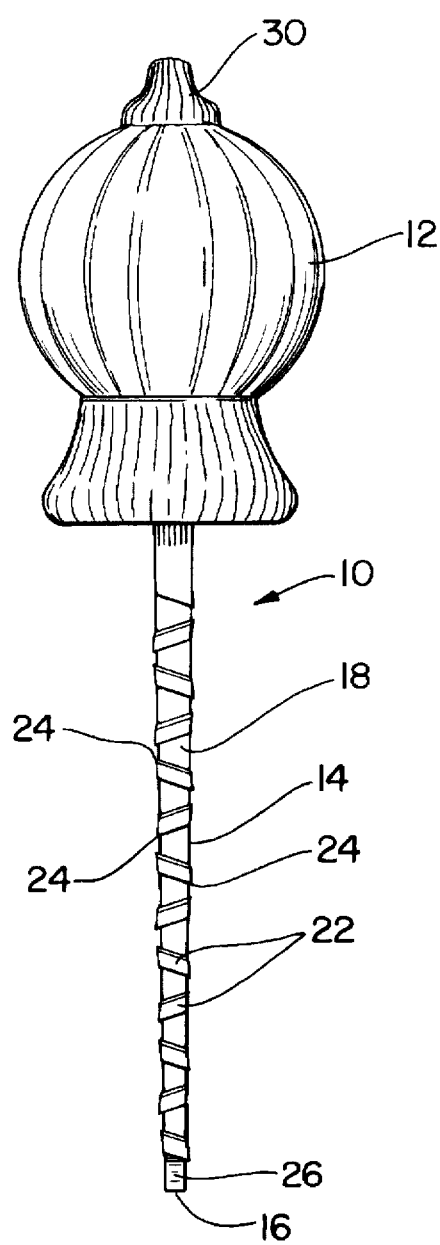
FIG. 6 is a right side elevation view of the carver in FIG. 1.
Figure 7:
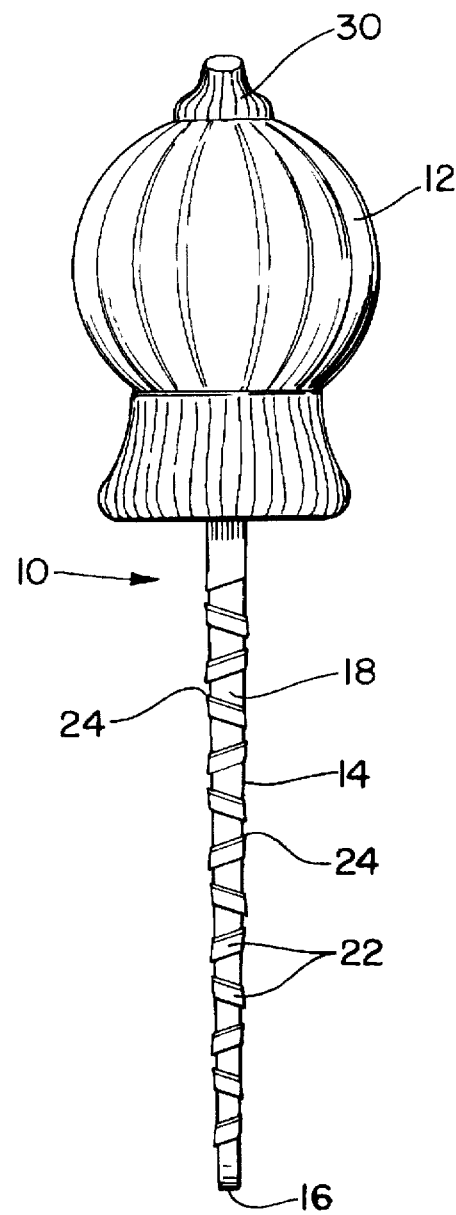
FIG. 7 is a left side elevation view of the carver in FIG. 1.

Cutting teeth 22 are each preferably provided with a cutting edge 24 protruding slightly beyond the plane defined by at least one of the blade sides 20. The cutting teeth are preferably oppositely angled relative to one another as shown in FIGS. 1, 6 and 7. The precise angle of the teeth relative to the axis of the blade 14 is not critical. However, the teeth preferably form an angle of between 5 and 45 degrees from the normal or perpendicular direction relative to the blade axis as shown in FIGS. 6 and 7. Cutting edges 24 on each of the cutting teeth 22 protrude slightly beyond the width of the blade 14 as defined by sides 20. In a preferred embodiment shown in FIGS. 1–7, a pair of cutting edges 24 are provided diametrically opposed to one another on opposite sides of each of the cutting teeth 22. The diametrically opposed cutting edges 24 permit cutting to occur when the cutter 10 is moved in a forward and reverse direction along the axis of the blade 14.

Significantly, the design of the blade 14 and cutting teeth 22 permits the cutter 10 to move freely as a user proceeds to carve the pumpkin or other large pulpy round fruit. In particular, the extension of the cutting teeth 22 slightly beyond the sides 20 of the blade ensures that the kerf, or width of the groove made by the cutter 10, will be adequate to allow the device to continue cutting without becoming jammed in place by compression of the fruit around the cutting blade 14. In this regard, it should be noted that the blade itself is tapered in the direction of the tip 16. The tapered shape of the blade facilitates ease of penetration through the fruit and allows a wider kerf to be formed as the blade is driven deeper into the fruit.

Trough 28 is formed on at least one and preferably both sides 20 of the blade 14. Trough 28 gradually increases in depth and width in the direction of handle 12 and has several important functions. The trough 28 provides mechanical stiffness to the blade 14, and provides a channel through which excess pulp and particulate matter can be cleared from the cutting zone when the cutter 10 is in use. More particularly, as the blade 14 is driven back and forth along its axis, pulp and particulate matter cut away by cutting teeth 22 will collect in the trough 28 and be forced outwardly toward the handle 12 by the pressure of the pulp on the sides 20 of the blade 14. Once again, this feature ensures that the blade 14 will not become stuck in the pulp as it cuts its way through.

Figure 8:
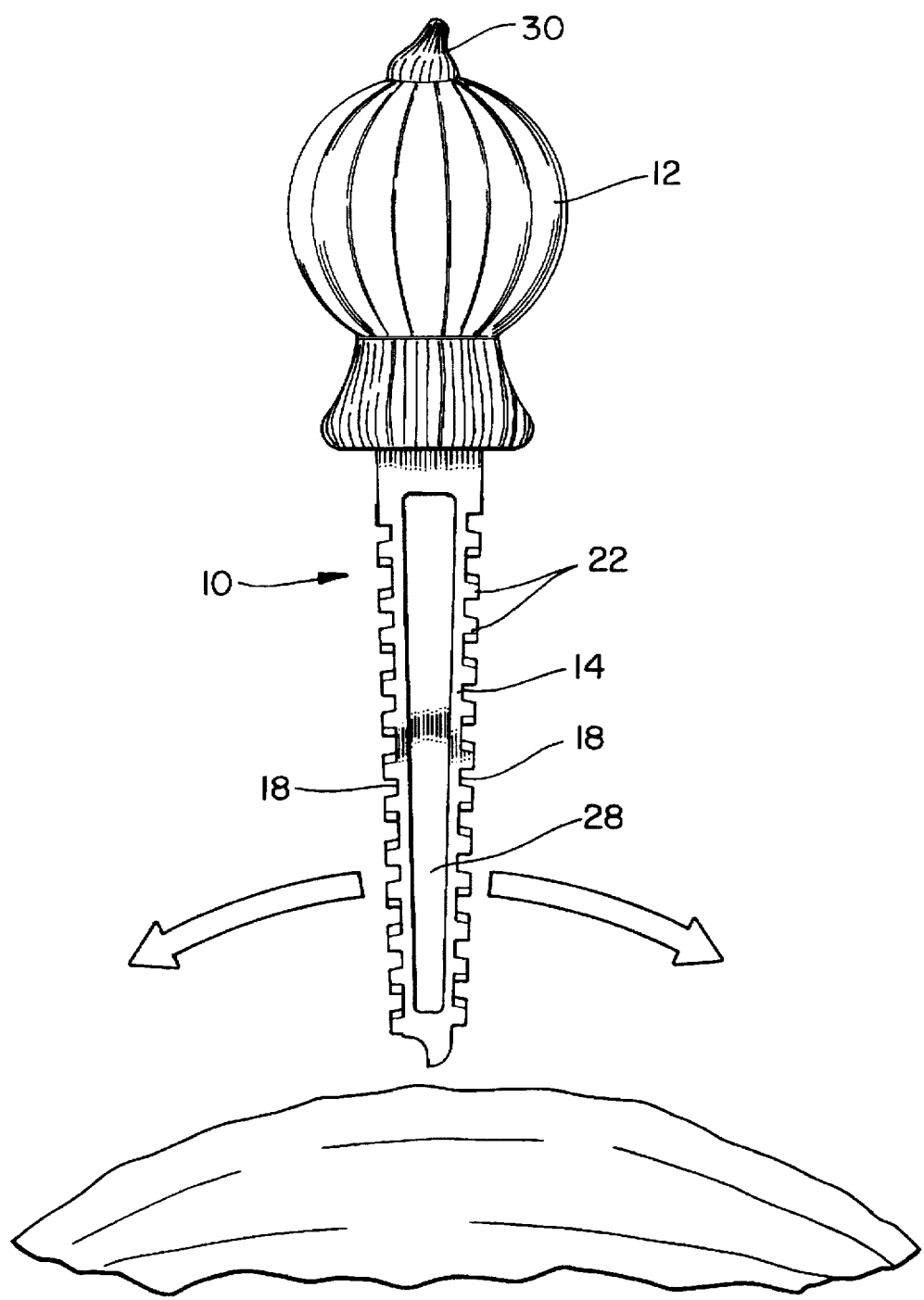
FIG. 8 is a side elevation view of the cutter penetrating the skin of a large round pulpy fruit.

At the tip 16 of the blade 14 is a hook 26 having an alternately concave and convex profile as shown in FIGS. 1–7. The hook 26 is a key aspect of the invention as it allows the blade to be driven deeper into the pulp or body of a pumpkin or other large round pulpy fruit, without the necessity of a pointed or sharp tip. This is an important safety feature. As noted above, the initial penetration of the skin of the fruit to be carved is made with the nub 30. Subsequently, however, the hook 26 allows the blade 14 to be driven deeper into the fruit or pulp firmly rocking the cutter 10 back and forth in the direction of the arrows in FIG. 8. The hook 26 will be caused to dig or ratchet its way into the pulp as the cutter is rocked back and forth in a direction parallel to the blade sides 20.

As the invention can be embodied in other specific forms without departing from the spirit or essential attributes thereof, reference should be made to the following claims, rather than to the foregoing specification, as indicating the scope of the invention.

I claim:

1. A child safe cutter for use by children in carving pulpy round fruits and capable of clearing particulate from a kerf being formed in said fruits to prevent jamming of said cutter therein, said cutter comprising:

a handle for gripping the cutter;

an elongated blade mounted on said handle and extending away therefrom to define a tip, said elongated blade having at least one edge and a thickness defined between two opposing side walls;

a plurality of cutting teeth positioned transversely along at least a portion of said at least one edge in an area between the handle and the tip;

each of said cutting teeth having a length extending between said two opposing sides walls and having a pair of cutting edges extending slightly beyond a plane aligned with each of said two opposing side walls, said cutting teeth angularly disposed relative to each other.

2. The cutter according to claim 1 wherein said cutting teeth form an angle of between about 5 and 45 degrees from the normal direction relative to an axis defined along the length of said blade.

3. The cutter according to claim 1 wherein said cutting teeth include a pair of cutting edges diametrically opposed to one another.

4. A child safe cutter for use by children in carving pulpy round fruits and capable of clearing particulate from a kerf being formed in said fruits to prevent jamming of said cutter therein, said cutter comprising:

a handle for gripping the cutter;

an elongated blade mounted on said handle and extending away therefrom to define a tip, said elongated blade having at least one edge and a thickness defined by two opposing sides;

a plurality of cutting teeth positioned transversely along at least a portion of said at least one edge in an area between the handle and the tip;

said cutting teeth being provided with at least one cutting edge extending slightly beyond the thickness of said blade and being alternately angularly disposed relative to each other, and wherein said tip is a hook member.

5. The cutter according to claim 4 wherein said hook member forms a part of said blade extending from said at least one edge and curving toward a centerline of the blade.

6. A child safe cutter for use by children in carving pulpy round fruits and capable of clearing particulate from a kerf being formed in said fruits to prevent jamming of said cutter therein, said cutter comprising:

a handle for gripping the cutter;

an elongated blade mounted on said handle and extending away therefrom to define a tip, said elongated blade having at least one edge and a thickness defined by two opposing sides;

a plurality of cutting teeth positioned transversely along at least a portion of said at least one edge in an area between the handle and the tip;

said cutting teeth being provided with at least one cutting edge extending slightly beyond the thickness of said blade and being alternately angularly disposed relative to each other, and wherein said blade includes a trough along at least one of said two opposing sides.

7. A child safe cutter for use by children in carving pulpy round fruits and capable of clearing particulate from a kerf being formed in said fruits to prevent jamming of said cutter therein, said cutter comprising:

a handle for gripping the cutter;

an elongated blade mounted on said handle and extending away therefrom to define a tip, said elongated blade having at least one edge and a thickness defined by two opposing sides;

a plurality of cutting teeth positioned transversely along at least a portion of said at least one edge in an area between the handle and the tip;

said cutting teeth being provided with at least one cutting edge extending slightly beyond the thickness of said blade and being alternately angularly disposed relative to each other, and wherein said cuter includes a nub having a tapered profile.

8. The cutter according to claim 7 wherein said nub is located on a portion of said handle opposite from said blade.

9. A child safe cutter for use by children in carving pulpy round fruits and capable of clearing particulate from a kerf being formed in said fruits to prevent jamming of said cutter therein, said cutter comprising:

a handle for gripping the cutter, said handle having a nub with a tapered profile;

an elongated blade mounted on said handle and extending away therefrom to define a tip, said elongated blade having at least one edge and a thickness defined by two opposing sides, said blade having a trough along at least one of said two opposing sides;

said tip having a hook formed thereon extending from said at least one edge and curving toward a centerline of the blade;

a plurality of cutting teeth positioned transversely along at least a portion of said at least one edge in an area between the handle and the tip, each of said cutting teeth being provided with at least one cutting edge extending slightly beyond the thickness of said blade and being alternately angularly disposed relative to each other at an angle of between about 5 and 45 degrees from the normal direction relative to an axis defined along the length of said blade.

* * * * *